3,427,206
SEPARATOR FOR ALKALINE CELLS
Paul Scardaville, East Northport, Thomas Wetherell, New York, and Lawrence Sears, Woodside, N.Y., assignors to RAI Research Corporation, Long Island City, N.Y., a corporation of New York
No Drawing. Filed Feb. 26, 1965, Ser. No. 435,690
U.S. Cl. 136—146          15 Claims
Int. Cl. H01m 3/02

ABSTRACT OF THE DISCLOSURE

A separator for secondary alkaline cells comprising a thin sheet of a graft copolymer of a polyethylene base and a graft of a polymer of an ethylenically unsaturated carboxylic acid, such as an acrylic acid. The polyethylene may first be crosslinked by irradiation and then immersed in a solution of an acrylic acid and subjected to further irradiation to form the graft copolymer.

---

This invention relates to secondary alkaline cells and more particularly to separators for the same.

The secondary alkaline battery systems, nickel-cadmium, silver-cadmium, and silver-zinc offer several advantages over lead acid cells. One advantage is the ability to deliver a greater amount of energy for a given weight. This advantage is particularly characteristic of the silver-cadmium and silver-zinc cells. The nickel-cadmium cells are superior to lead acid cells in their ability to deliver a high discharge current. Thus alkaline secondary battery systems are extremely attractive for various commercial, military, and aerospace applications in portable, powered appliances of all types.

Silver-cadmium and silver-zinc cells suffer from the disadvantage of limited cycle life. This disadvantage has limited their usefulness in spite of their advantages of high energy content compared to lead acid cells as above noted. One reason for the limited cycle life of silver-cadmium and silver-zinc cells is the slight, but by no means insignificant, solubility of silver oxides in the alkaline electrolyte, which customarily is 30 to 45% KOH. These oxides are present in both true solution and in colloidal solution. Transmigration of silver oxides to the negative electrode results in local couples and self-discharge of the negative plate.

Cycle life in the silver-zinc system is further impaired by the high solubility of zinc oxide as potassium zincate. Zinc dendrites are deposited on the negative plate during charge, as a result of the reduction of zincate in solution to metallic zinc. These dendrites rapidly span the narrow gap between the positive and negative plates and short circuit the cell.

Presently known separators are unsatisfactory for alkaline cells and particularly those having silver electrodes. Battery engineers have sought suitable new separator materials.

Ideally, battery separators for cells having silver electrodes should be absorptive, readily allow passage of electrolyte ions so as to possess a low electrical resistance, not be adversely affected by concentrated potassium hydroxide solutions, be stable over the temperature range of −40° F. to 200° F., be impermeable to dissolved silver oxides and zincate ion and be inert to oxidation by silver oxide, silver peroxide and nascent oxygen.

The usual porous mats and so-called micro-porous materials, such as are used in the lead acid system, do not significantly prolong the lives of these cells, as these separators have too open a structure. They do not impede the passage of zincate ions or colloidal particles, nor slow the growth of zinc dendrites.

For many years, the only suitable separator membranes available were cellulosics such as cellophane and supported and unsupported sausage casings, which are a purer form of regenerated cellulose.

The cellulosics absorb sufficient electrolyte so as to have low electrical resistances. Furthermore, they slow the advance of silver oxides toward the negative plate by virtue of their reactivity towards silver oxides. That is, they are oxidized by the silver oxides, which in turn are reduced to silver metal which is deposited within and on the cellulosic separator. Furthermore, their swollen, gel-like state, which they possess when immersed in alkaline electrolytes, tends to retard the growth of zinc dendrites in silver-zinc cells.

The cellulosics have several inherent disadvantages. They are, first of all, subject to hydrolytic attack by the electrolyte and undergo oxidative degradation in alkaline media. This attack most likely takes place by a mechanism whereby cleavage occurs at the gem-diol positions of the rings. Thus they are not notably long-lived, especially at elevated temperatures such as occur on high rate charge and discharge.

Secondly, the mechanism whereby cellulosic membranes slow the advance of silver oxides, not only somewhat reduces the available silver capacity, but, more important, so heavily loads the membrane with metallic silver that it becomes electrically conductive. Since the electrode assemblies are tightly packed, these electrically conductive silver-loaded membranes offer a path to short circuit the cell. Multiple layers of cellulosics have been used to compensate for their instability and for their tendency to "load" with silver to the point of becoming electrically conductive. The loading of the cellulose membranes with silver in effect advances the silver electrode towards the growing zinc dendrites, resulting in premature shorting of the cell in spite of the multiple layers of separator material.

The penalty paid for the use of thick, multilayer systems having a thickness of 15 to 25 mils (.015 to .025 inch) or more, is a considerable reduction in the available energy and current density of the system as compared to that which is theoretically possible.

A major improvement in separators has been made by the use of conductive membranes prepared by introducing permanently bonded ionizable groups into inert polymer films. For example, the introduction of carboxyl groups into a polyethylene base polymer yields an ionically conductive membrane inert to both hydrolysis and oxidation attack in the electrolyte. It has been found that in order to obtain low electrical resistance, high concentrations of carboxyl groups are needed.

Radiation produced graft copolymers in thin sheet form, containing an ethylenically unsaturated carboxylic acid grafted to a polyolefin film, are outstanding separator materials according tot his invention. Polyethylene is a preferred polyolefin, and acrylic and methacrylic acids are preferred ethylenically unsaturated acids. These copolymers have low electrical resistance. These membranes are ionically conductive and inert to hydrolysis and oxidative attack in the electrolyte. Moreover, they can be made very thin, 1 to 1.5 mils wet thickness, as compared to 4 to 6 mils wet thickness for the better cellulosic membranes. They slow the advance of dissolved silver oxides toward the negative electrode without being oxidized and without reducing the silver oxides to metallic silver. Furthermore, they are capable of being heated at 125° C. (about 250° F.) in 40% potassium hydroxide for 16 hours without deteriorating.

The rate of diffusion of dissolved silver oxides and zincate ions and the penetrability by zinc dendrites varies in graft copolymer separators as a function of the degree of graft and the density, and hence the crystallinity, of the polyolefin starting material. Since grafting occurs only in the amorphous regions, the more crystalline polyethylene starting materials yield membranes with fewer and smaller pores. This has been demonstrated in permeability studies and cell testing.

Prior to this invention it was throught that membranes with low graft levels would have higher resistance but would have a greater cycle life than high graft level membranes, due to the decreased permeability to silver oxides and zinc ions in the low graft membranes.

It has been found unexpectedly according to the present invention that high graft membranes prepared from radiation cross linked polyethylene are vastly superior to other graft copolymer membranes. This unexpected superiority has been demonstrated in comparative tests of high and low graft level membranes under identical test conditions.

Cells according to the present invention are of the secondary alkaline type, containing a positive electrode, a negative electrode, an alkaline electrolyte, and a separator between the adjacent electrodes of opposite polarity. The positive electrode may be of a known electrode material such as silver or nickel and the negative electrode likewise of a known electrode material such as zinc or cadmium. Thus, silver-zinc, silver-cadmium, nickel-cadmium and nickel-zinc alkaline cells are within the purview of this invention. Each electrode may contain a single plate or a plurality of plates as is known in the art. Conventional alkaline electrolytes, such as 30 to 45% aqueous potassium hydroxide, may be used.

The novel separator materials according to the present invention are graft copolymers in which the base is a film of a polyolefin and the graft is a polymer of an ethylenically unsaturated carboxylic acid. Polyethylene is a preferred base material; blends of polyethylene with other olefinic polymers, as for example a polyethylene-polyisobutylene blend are also suitable. For best results the polyethylene should be cross linked. Cross linking is most readily achieved by exposure to a radiation source such as the beam of an electron accelerator until the total dose is at least 10 megarads. The total dose is generally in the range of 10 to 70 megarads. It is seldom necessary or desirable to irradiate to doses higher than 70 megarads. Other means for cross linking which will give an equivalent amount of cross linking are also suitable. For example, polyethylene may be cross linked with known cross linking agents such as divinyl benzene if desired. Cross linking of the polyethylene base is preferably carried out prior to grafting.

The graft polymer is preferably polyacrylic acid, polymethacrylic acid, or a copolymer of acrylic acid and methacrylic acid. Polymers of other ethylenically unsaturated carboxylic acids are also suitable however. The graft may be prepared by immersing the base film of polyethylene or other polyolefin in a solution of monomer, e.g. acrylic acid, methacrylic acid, or mixtures thereof. The solvent is preferably a liquid aliphatic or aromatic hydrocarbon, such as hexane, heptane, benzene, toluene or xylene. A small amount of a chlorinated hydrocarbon polymerization promoter such as carbon tetrachloride is also present in the monomer solution. The monomer solution with base film immersed is then exposed to polymerization conditions. Polymerization is preferably carried out by exposure of the monomer solution to a radiation source, such as cobalt–60. The total radiation dose is sufficient to effect polymerization and ordinarily is at least 1 megarad. The amount of graft is generally 5 to 15 mole percent, in which the molecular weight of the graft material is based on the molecular weight of the monomer and the molecular weight of the base material used for the calculation is the formula weight of a methylene unit.

Battery separators according to this invention are prepared in thicknesses ranging from about 0.25 to about 2.0 mils. Generally the thickness will be from about 1.0 to about 1.5 mils. A preferred polyethylene base film will have a thickness of about 1.0 mil.

The total separator thickness in cells of this invention is preferably about 0.25 to about 9.0 mils. One or more layers of membrane may be used in order to achieve this thickness. Excellent results have been obtained for example with two layers of membrane according to this invention having a total separator thickness of 3 mils when compressed, i.e., a thickness of 1.5 mils per layer.

This invention will now be described with reference to specific embodiments thereof as illustrated in the examples which follow:

Example 1

A battery separator membrane is prepared from 1.0 mil, 0.914 density polyethylene film as follows: The polyethylene film is cross linked by irradiation under the beam of an electron accelerator to a total dose of 10 megarads. The cross linked film is rolled up with a cheesecloth spacer and immersed in a solution consisting of 25% glacial acrylic acid, 7.5% $CCl_4$ and 67.5% benzene (all solution percentages by volume). The film-solution combination is then irradiated to a total dose of 1.012 megarads at a dose rate of 50,600 rads/hour using a cobalt-60 radiation source. The film is then washed free of homopolymer. This gives a graft copolymer of a polyethylene base and a polyacrylic acid graft, the graft constituting 5.0 mole percent of the total.

Example 2

A battery separator is prepared from 1.0 mil, 0.922 density polyethylene film as follows: The film is cross linked by irradiation under the beam of an electron accelerator to a total dose of 30 megarads. The film is then rolled up with an absorbent interlayer and the roll immersed in a monomer solution consisting of 30% by volume glacial acrylic acid, 67% by volume benzene, toluene or xylene and 3% by volume carbon tetrachloride. The film-solution combination is then irradiated to a dose of 2.23 megarads at a dose rate of 17,200 rads/hour using a cobalt-60 radiation source. The membrane is washed free of homopolymer. This gives a graft copolymer in which the polyacrylic acid graft constitutes 5.4 mole percent of the total.

Example 3

A battery separator is prepared from 0.9 mil, 0.960 density polyethylene film as follows: The film is cross linked by irradiation under the beam of an electron accelerator to a total dose of 30 megarads. The cross linked film is then rolled up in absorbent paper and immersed in a solution consisting of 30% by volume glacial methacrylic acid and 70% benzene. The film-solution combination is then irradiated to a total dose of 2.7 megarads at a dose rate of 17,800 rads/hour using a cobalt-60 radiation source. The membrane is washed free of homopolymer. This gives a graft copolymer of a polyethylene base and polyacrylic acid graft, the graft constituting 7.1 mole percent of the total.

Example 4

A battery separator is prepared from 0.9 mil, 0.960 density polyethylene film having a melt index of 5.0 as follows: The film is cross linked by irradiation under the beam of an electron accelerator to a total dose of 30 megarads. The film is then rolled up in absorbent paper and immersed in a solution consisting of 25% by volume glacial acrylic acid, 70% by volume benzene and 5% by volume carbon tetrachloride. The film-solution combination is then irradiated at a dose rate of 22,300 rads/hour to a total dose of 3.35 megarads. The membrane is washed free of homopolymer. This gives a graft copolymer of polyethylene base and polyacrylic acid graft, the graft constituting 9.3 mole percent of the total.

Example 5

A battery separator is prepared from 1.0 mil, 0.917 density polyethylene film as follows: The film is cross linked by irradiation under the beam of an electron accelerator to a total dose of 70 megarads. The film is rolled up with an interlayer of absorbent paper and immersed in a solution consisting of 25% glacial acrylic acid, 70% benzene, and 5% carbon tetrachloride (all percentages by volume). The film-solution combination is irradiated at a dose rate of 14,500 rads/hour to a total dose of 1.044 megarads using a cobalt-60 radiation source. The film is washed free of homopolymer. The graft copolymer is then subjected to a second grafting under the same conditions as described in this example. This gives a graft copolymer in which the graft constitutes 10.1 mole percent of the total.

Example 6

A battery separator is prepared from 1.0 mil, 0.960 density, 0.2 melt index polyethylene film as follows: The film is cross linked by irradiation under the beam of an electron accelerator to a total dose of 50 megarads. The film is then rolled up with a cheesecloth spacer and immersed in a solution consisting of 25% by volume glacial acrylic acid and 75% by volume benzene. The film-solution combination is irradiated to a total dose of 1.73 megarads at a dose rate of 14,500 rads/hour using a cobalt-60 radiation source. The film is washed free of homopolymer and the grafting step as described above is repeated. This gives a graft copolymer containing 5.8 mole percent of a polyacrylic acid graft.

Example 7

A battery separator is prepared from 1.0 mil, 0.922 density polyethylene film as follows: The film is rolled up with an absorbent spacer. The roll is immersed in a solution containing 25% glacial acrylic acid, 70% toluene, and 5% carbon tetrachloride (all percentages by volume). The film-solution combination is irradiated to a total dose of 1.6 megarads at a dose rate of 16,000 rads/hour using a cobalt-60 radiation source. The membrane is washed free of homopolymer. The polyethylene is then cross linked by irradiation of the membrane under the beam of an electron accelerator to a dose of 30 megarads. This gives a graft copolymer containing 7.3 mole percent of graft.

Example 8

A battery separator is prepared from 1.0 mil, 0.917 density polyethylene as follows: The polyethylene film is cross linked with divinyl benzene. This is accomplished by immersing a film in a 5% solution of divinyl benzene in benzene and irradiating the combination of film and solution at a dose rate of 13,100 rads/hour to a total dose of 0.223 megarad. After rinsing in benzene, the cross linked film is rolled up with an absorbent interlayer and immersed in a solution consisting of 1 part glacial acrylic acid and 3 parts benzene by volume. The film-solution combination is irradiated at a dose rate of 13,100 rads/hour to a total dose of 1.71 megarads. This gives a graft copolymer containing 14.8 mole percent of polyacrylic acid graft.

Example 9

A battery separator is prepared from a 1.0 mil film extruded from a 0.938 density polyolefin resin consisting of a blend of polyisobutylene polyethylene as follows: The polyolefin film is rolled up with an absorbent spacer. The roll is immersed in a solution consisting of 1 part glacial acrylic acid, 2.8 parts of benzene and 0.2 part of a 50% divinyl benzene solution. The film-solution combination is irradiated to a dose of 2.256 megarads at a dose rate of 18,800 rads/hour using a cobalt-60 source. The copolymer contains 6.2 mole percent grafted acrylic acid.

Battery separators according to this invention were incorporated in test cells and tested as described in Examples 10 and 11 which follow.

Example 10

Test cells having three plates and a capacity of two ampere hours each were constructed using the various separators indicated below. Three cells of each of the indicated separator materials were constructed. All cells were silver oxide-zinc cells having an alkaline electrolyte. Each cell had two layers of separator membrane having a total separator thickness of 3.0 mils. All cells were put on a cycle life test using a cycle of 35 minutes discharge and 85 minutes charge. Separator materials and the number of cycles to failure are indicated in Table I below.

TABLE I

| Separator: | Cycles to failure (average values for 3 cells) |
|---|---|
| Low density, uncrosslinked 7.8 mole percent graft (high graft) | 174 |
| Low density, uncrosslinked 5.4 mole percent graft (low graft) | 279 |
| High density, uncrosslinked 11.9 mole percent graft (high graft level) | 532 |
| High density crosslinked, 30 mrads high graft level | 249 |
| Low density crosslinked, 30 mrads high graft level | 508 |

Example 11

A number of 25 ampere hour silver-zinc cells having an alkaline electrolyte and various separator materials as indicated in Table II below were built. All were tested on the same test cycle of 35 minutes discharge and 85 minutes charge, discharging to a 25% depth of discharge. Each cell had four layers of separator membrane, with a total separator thickness of 6.0 mils. Results showing the number of cycles to failure are indicated in Table II.

TABLE II

| Separator: | Cycles to failure |
|---|---|
| High density, uncrosslinked 12.2 mole percent graft | 414 average. |
| Low density, crosslinked (30 mrad) 10 mole percent graft | 580 average. |
| Low density, crosslinked 13 mole percent graft | 2130 average (still cycling). |

We claim:

1. A secondary alkaline cell comprising a positive electrode, a negative electrode, an aqueous alkaline electrolyte, and a separator between said electrodes, said separator comprising a thin sheet of graft copolymer of a polyethylene base and a graft of a polymer of an ethylenically unsaturated carboxylic acid wherein said graft is 5–15 mole percent of said polyethylene.

2. A secondary alkaline cell comprising a positive electrode, a negative electrode, an aqueous alkaline electrolyte, and a separator between said electrodes, said separator comprising a thin sheet of a graft copolymer of a polyethylene base and a graft selected from the group consisting of polyacrylic acid, polymethacrylic acid, and acrylic acid-methacrylic acid copolymers wherein said graft is 5–15 mole percent of said polyethylene.

3. A secondary alkaline cell comprising a positive electrode, a negative electrode, an aqueous alkaline electrolyte, and a separator between said electrodes, said separator comprising a thin sheet of a graft copolymer of a base of crosslinked polyethylene and a graft selected from the group consisting of polyacrylic acid, polymethacrylic acid, and acrylic acid-methacrylic acid copolymers.

4. A secondary alkaline cell comprising a positive electrode, a negative electrode, an aqueous alkaline electrolyte, and a separator between said electrodes, said separator comprising a thin sheet of a graft copolymer of a base of radiation cross linked polyethylene and a graft selected from the group consisting of polyacrylic acid, polymethacrylic acid, and acrylic acid-methacrylic acid copolymers.

5. A secondary alkaline cell comprising a positive electrode, a negative electrode, an aqueous alkaline electrolyte, and a separator between said electrodes, said separator comprising a thin sheet of a graft copolymer of a base of polyethylene cross linked by exposure to a radiation dose of at least 10 megarads and a graft selected from the group consisting of polyacrylic acid, polymethacrylic acid, and acrylic acid-methacrylic acid copolymers.

6. A secondary alkaline cell comprising a positive electrode, a negative electrode, an aqueous alkaline electrolyte, and a separator between said electrodes, said separator comprising a thin sheet of a graft copolymer of a base of a polyethylene-polyisobutylene blend and a graft selected from the group consisting of polyacrylic acid, polymethacrylic acid, and acrylic acid-methacrylic acid copolymers.

7. A secondary alkaline cell comprising a positive electrode, a negative electrode, an aqueous alkaline electrolyte, and a separator between said electrodes, said separator having a total thickness of 0.25 to 9.0 mils and comprising at least one thin sheet of a graft copolymer of a polyolefin base and a graft selected from the group consisting of polyacrylic acid, polymethacrylic acid, and acrylic acid-methacrylic acid copolymers.

8. A secondary alkaline cell comprising a positive electrode, a negative electrode, an aqueous alkaline electrolyte, and a separator between said electrodes, said separator comprising a plurality of thin sheets of a graft copolymer of a polyolefin base and a graft selected from the group consisting of polyacrylic acid, polymethacrylic acid, and acrylic acid-methacrylic acid copolymers, each sheet having a thickness of 0.25 to 2.0 mils.

9. The cell of claim 5 wherein said graft is formed by irradiation of said polyethylene in an organic solution of monomers of said acids, and said graft is 5–15 mole percent of said polyethylene.

10. The cell of claim 5 wherein said separator has a thickness of about 0.25 to about 2 mils.

11. The cell of claim 5 wherein said polyethylene is crosslinked by exposure to a radiation dose of at least 30 megarads.

12. The secondary alkaline cell of claim 5 wherein said graft copolymer is a radiation graft of said polyethylene in a solution of monomers of said acids.

13. The secondary alkaline cell of claim 12 wherein said radiation graft is of a dose rate of from about 13,100 to about 50,600 rads per hour to provide a total dose of at least about 1 megarad.

14. The secondary alkaline cell of claim 5 wherein said graft copolymer is polyethylene irradiated in an organic solution of monomers of said acids and wherein said base is polyethylene subsequently cross linked by exposure to said radiation dose.

15. The secondary alkaline cell of claim 14 wherein said base is polyethylene cross linked by said exposure to a radiation dose of at least 10 megarads and said irradiation of said graft is of a lower dose than 10 megarads.

References Cited

UNITED STATES PATENTS

| | | | |
|---|---|---|---|
| 2,965,697 | 12/1960 | Duddy | 136—146 |
| 3,101,276 | 8/1963 | Hendricks | 117—56 |
| 3,111,424 | 11/1963 | Le Clair | 117—93.31 X |
| 3,188,165 | 6/1965 | Magat et al. | 117—93.31 X |
| 3,240,723 | 3/1966 | Friedlander | 136—146 X |

WINSTON A. DOUGLAS, *Primary Examiner.*

DONALD L. WALTON, *Assistant Examiner.*

U.S. Cl. X.R.

117—93.31